(12) United States Patent
Thomas

(10) Patent No.: US 12,365,068 B2
(45) Date of Patent: Jul. 22, 2025

(54) AXLE HUB AND ROTOR ASSEMBLY REMOVAL TOOL

(71) Applicant: TaKellia Thomas, Chattanooga, TN (US)

(72) Inventor: Eric Thomas, Chattanooga, TN (US)

(*) Notice: Subject to any disclaimer, the term of this patent is extended or adjusted under 35 U.S.C. 154(b) by 0 days.

(21) Appl. No.: 18/504,586

(22) Filed: Nov. 8, 2023

(65) Prior Publication Data
US 2024/0269809 A1    Aug. 15, 2024

Related U.S. Application Data

(60) Provisional application No. 63/445,476, filed on Feb. 14, 2023.

(51) Int. Cl.
*B25B 27/00* (2006.01)
*B23P 19/02* (2006.01)
*B25B 27/02* (2006.01)
*B60S 5/00* (2006.01)

(52) U.S. Cl.
CPC ........ *B25B 27/0035* (2013.01); *B25B 27/023* (2013.01); *B23P 19/025* (2013.01); *B60S 5/00* (2013.01)

(58) Field of Classification Search
CPC .... B23P 19/025; B23P 19/04; B25B 27/0035; B25B 27/023
See application file for complete search history.

(56) References Cited

U.S. PATENT DOCUMENTS

| | | | |
|---|---|---|---|
| 5,544,402 A * | 8/1996 | O'Neil | B25B 27/02 29/261 |
| 6,481,084 B2 | 11/2002 | Pool | |
| 6,880,218 B2 | 4/2005 | Christopher | |
| 6,925,696 B1 | 8/2005 | Williams | |
| 8,347,474 B2 | 1/2013 | Oachs | |
| 2002/0124376 A1 | 9/2002 | Pool | |

* cited by examiner

*Primary Examiner* — Christopher J. Besler
(74) *Attorney, Agent, or Firm* — Brennan, Manna & Diamond, LLC

(57) ABSTRACT

An axle hub and rotor assembly removal tool designed for efficient brake rotor removal from drive axles. The tool is constructed with a main body comprising a rectangular metal plate and transverse plates. The tool also features a threaded rod with continuous threads and a hex nut. A pair of nut and bolt assemblies are used for fastening onto wheel studs of the brake rotor. When placed on the axle hub, the tool's nuts are secured to the studs and are turned clockwise to create a small gap between the axle and the brake rotor. The threaded rod facilitates the brake rotor separation by providing leverage against the axle shaft.

4 Claims, 4 Drawing Sheets

AXLE HUB AND ROTOR ASSEMBLY REMOVAL TOOL

CROSS-REFERENCE TO RELATED APPLICATION

The present application claims priority to, and the benefit of, U.S. Provisional Application No. 63/445,476, which was filed on Feb. 14, 2023, and is incorporated herein by reference in its entirety.

FIELD OF THE INVENTION

The present invention generally relates to the field of brake rotor puller devices. More specifically, the present invention relates to a novel axle hub and rotor assembly removal tool for removing brake rotor from axle hub. The tool includes a channel with a threaded rod located in the middle of the channel and two bolt and nut assemblies. In use, the two nuts are threaded onto the brake rotor's wheel studs and turned clockwise until the stud bottoms out. Then, the center bolt is turned until the brake rotor is separated from the axle shaft. Accordingly, the present disclosure makes specific reference thereto. Nonetheless, it is to be appreciated that aspects of the present invention are also equally applicable to other like applications, devices, and methods of manufacture.

BACKGROUND

By way of background, brake rotors are used in vehicles and are a critical component of a vehicle's braking system. Brake rotors help in slowing down and stopping the vehicle by working in conjunction with brake pads and other brake components. Brake rotors are prone to frequent damage and change in industrial and heavy vehicles. Brake rotors need to be removed and replaced when they are damaged, excessively worn, or when other brake system maintenance or repairs are required. Worn or damaged brake rotors can compromise braking performance and safety, making replacement necessary.

Traditionally, removing brake rotors requires detaching brake rotors from an axle such as a Rockwell drive axle. Removing brake rotors is challenging and time consuming as brake rotors can become rusted and corroded over time due to exposure to the elements and the heat generated during braking. Many operators use hammer but it can lead to uneven force application which might cause the brake rotor to come off at an angle, potentially damaging the brake rotor, hub, or axle threads. Some brake rotor designs and axle configurations make it challenging for an operator to find a secure point to grip the brake rotor for removal. As a result, the operator may find difficulty to apply even force and hence, the risk of damaging the brake rotor or hub increases.

Conventionally, different tools such as brake rotor pullers are used for removal of brake rotors. Such tools hook or arm grasp the brake rotor's edge, however, are difficult to operate and require manual effort. People desire an improved and simple device for removing brake rotors from a drive axle without damaging the brake and axle components.

Therefore, there exists a long felt need in the art for an improved axle hub and rotor assembly removal tool. Additionally, there is a long felt need in the art for a device for removing brake rotors from a vehicle axle such as Rockwell drive axle. Moreover, there is a long felt need in the art for an improved brake rotor removing device that does not damage the brake components and axle while removing the brake rotor. Further, there is a long felt need in the art for a Rockwell axle hub and rotor assembly removal tool that is portable, easy to use, and simplifies the brake rotor removal process. Furthermore, there is a long felt need in the art for an improved brake rotor removal device that can be attached easily to a brake rotor to pull the brake rotor to separate from the axle shaft. Finally, there is a long felt need in the art for an axle hub and rotor assembly removal tool that saves considerable time and effort when installing and removing brake rotors.

The subject matter disclosed and claimed herein, in one embodiment thereof, comprises an axle brake rotor puller device. The device includes a rectangular (i.e., rectilinear) plate that acts as a channel with a threaded rod located in the middle of the channel. Two symmetrical plates extend transversely from the top edge and the bottom edge of the rectangular (i.e., rectilinear) plate for supporting the device when the device is placed on an axle hub. The device also includes a hex nut for securing the threaded rod and two bolt and nut assemblies. The device is secured with the nuts secured to wheel studs and turning the nuts clockwise until the stud bottoms out and then the center threaded rod is turned clockwise until the rod makes contact with the axle shaft to separate the brake rotor and the axle shaft.

In this manner, the axle brake rotor puller device of the present invention accomplishes all of the forgoing objectives and provides users with a brake rotor removal tool that simplifies the brake rotor removal process while also serving as a handle for convenient transportation. The device is attached to the brake rotor to pull the brake rotor to detach from the axle hub and saves considerable time and effort when installing and removing brake rotors.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an axle hub and rotor assembly removal tool. The tool helps in the removal of brake rotors from a drive axle and comprises a main body formed by a rectangular (i.e., rectilinear) metal plate having a top lateral edge and a bottom lateral edge, wherein the main body further comprises a top transverse plate extending transversely from the top lateral edge and a bottom transverse plate extending transversely from the bottom lateral edge, the top transverse plate and the bottom transverse plate are rectangular (i.e., rectilinear) and have lengths equal to the length of the rectangular metal plate. The tool also includes a threaded rod passing through a central hole disposed on the rectangular metal plate, a first set of nut and bolt assembly passing through a first opening and a second set of nut and bolt assembly passing through a second opening in the rectangular metal plate, a hex nut coupled with the threaded rod for securing and guiding the threaded rod and enabling controlled movement for applying force, wherein, when the tool is installed over an axle hub the nuts of the first set and the second set are threaded to wheel studs and the threaded rod is fastened to the axle shaft.

In yet another embodiment, a method for using an axle hub and rotor assembly removal tool to remove a brake rotor from an axle hub is described. The method including the steps of providing the tool, the tool includes a main body formed by a rectangular (i.e., rectilinear) metal plate and two transverse plates extending transversely from the top edge and bottom edge of the rectangular (i.e., rectilinear) metal plate, a threaded rod, a first set of nut and bolt assembly, and a second set of nut and bolt assembly, removing a tire to access the brake rotor mounted on the axle hub, placing the tool onto the axle hub such that the main body covers a portion of the brake rotor, threading nuts of the first set and the second set onto wheel studs of the brake rotor, turning the nuts in a clockwise direction, inserting the threaded rod into a central opening by removing castle nut of the brake rotor, and turning the threaded rod in a clockwise direction until a bottom end of the threaded rod contacts an axle shaft, thereby providing a point of leverage for separating the brake rotor from the axle shaft.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
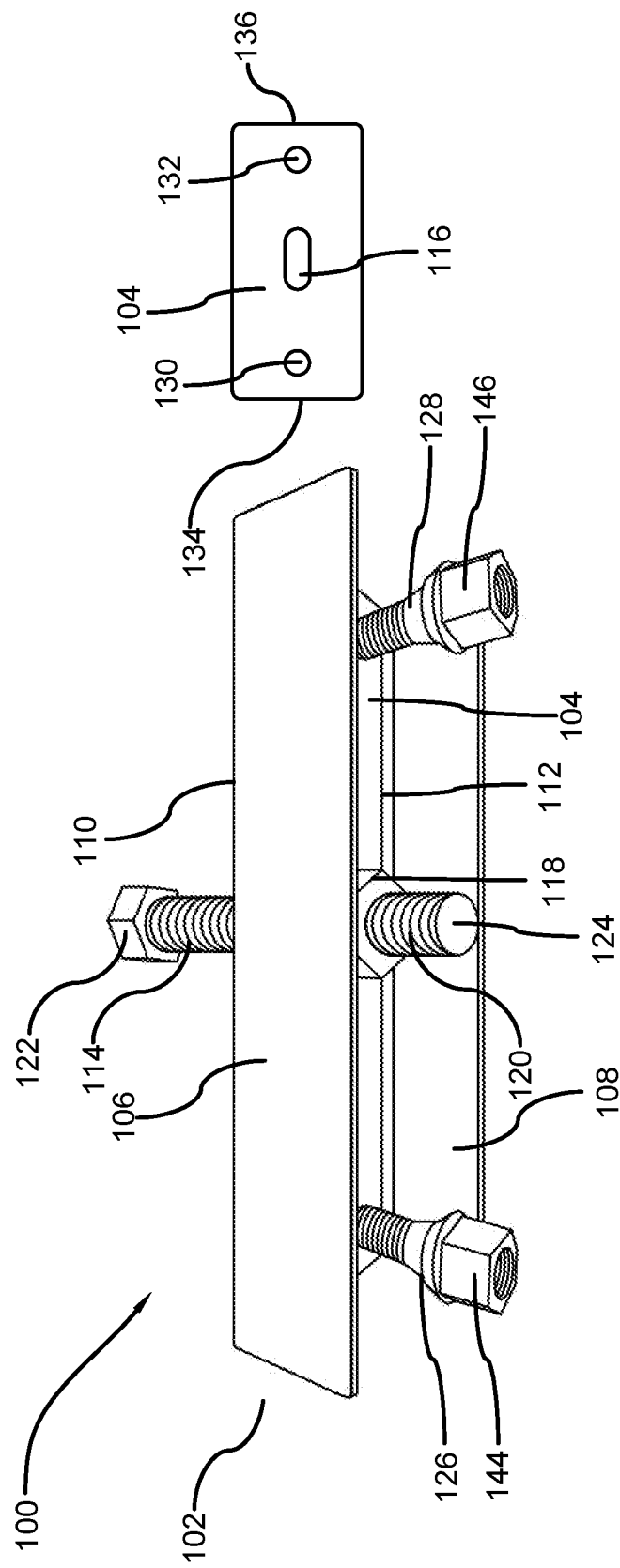
FIG. 1 illustrates a perspective view of an axle hub and rotor assembly removal tool of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an improved axle hub and rotor assembly removal tool. Additionally, there is a long felt need in the art for a device for removing brake rotors from a vehicle axle such as Rockwell drive axle. Moreover, there is a long felt need in the art for an improved brake rotor removing device that does not damage the brake components and axle while removing the brake rotor. Further, there is a long felt need in the art for a Rockwell axle hub and rotor assembly removal tool that is portable, easy to use, and simplifies the brake rotor removal process. Furthermore, there is a long felt need in the art for an improved brake rotor removal device that can be attached easily to a brake rotor to pull the brake rotor and separate same from the axle shaft. Finally, there is a long felt need in the art for an axle hub and rotor assembly removal tool that saves considerable time and effort when installing and removing brake rotors.

The present invention, in one exemplary embodiment, is a Rockwell axle hub and rotor assembly removal tool. The tool includes a main body that acts as a channel and is formed by a rectangular (i.e., rectilinear) metal plate, a top transverse plate and a bottom transverse plate. The tool also includes a threaded rod in the form of a bolt passing through a central hole disposed on the rectangular metal plate, a first set of nut and bolt assembly passing through a first opening and a second set of nut and bolt assembly passing through a second opening in the rectangular metal plate, a hex nut coupled with the threaded rod for securing and guiding the threaded rod and enabling controlled movement for applying force, wherein, when the tool is installed over an axle hub the nuts of the first set and the second set are threaded to wheel studs and the threaded rod is fastened to the axle shaft.

Referring initially to the drawings, FIG. 1 illustrates a perspective view of the axle hub and rotor assembly removal tool of the present invention in accordance with the disclosed architecture. The axle hub and rotor assembly removal tool 100 of the present invention is designed as a device to aid in the removal of brake rotors from a drive axle such as Rockwell drive axle. The brake rotor removal tool 100 serves as both a removal tool and a means of transporting the brake rotor after removal. More specifically, the device 100 includes a main body 102 formed by a rectangular (i.e., rectilinear) metal plate 104 and a pair of transverse plates 106, 108. The top transverse plate 106 extends transversely from the top lateral edge 110 of the rectangular metal plate 104. Similarly, the bottom transverse plate 108 extends transversely from the bottom lateral edge 112 of the rectangular metal plate 104. The metal plates 106, 108 are rectangular (i.e., rectilinear) and have lengths equal to a length of the rectangular metal plate 104. The metal plates 104, 106, 108 are integrated to form the one-piece structure of the main body 102. The main body 102 functions as a channel for easy installation for removing a brake rotor as described in FIGS. 2 and 3.

A threaded rod 114 is passed along a central hole 116 disposed on the rectangular metal plate 104. The threaded rod 114 serves as the central component for applying force to separate the brake rotor from the axle shaft. A hex nut 118 is coupled with the threaded rod 114 and is used to secure and guide the threaded rod 114, enabling controlled movement when applying force. The threaded rod 114 includes continuous threads 120 from the head 122 to the bottom end 124 thereof.

The brake rotor removal tool 100 includes a first set 126 of nut and bolt assembly and a second set 128 of nut and bolt assembly. The first set 126 passes through a first opening 130 and the second set 128 passes through a second opening 132. The first opening 130 and the second opening 132 are equidistant from the opposite edges 134, 136 of the rectangular metal plate 104 and also equidistant from the central hole 116.

Figure 2:
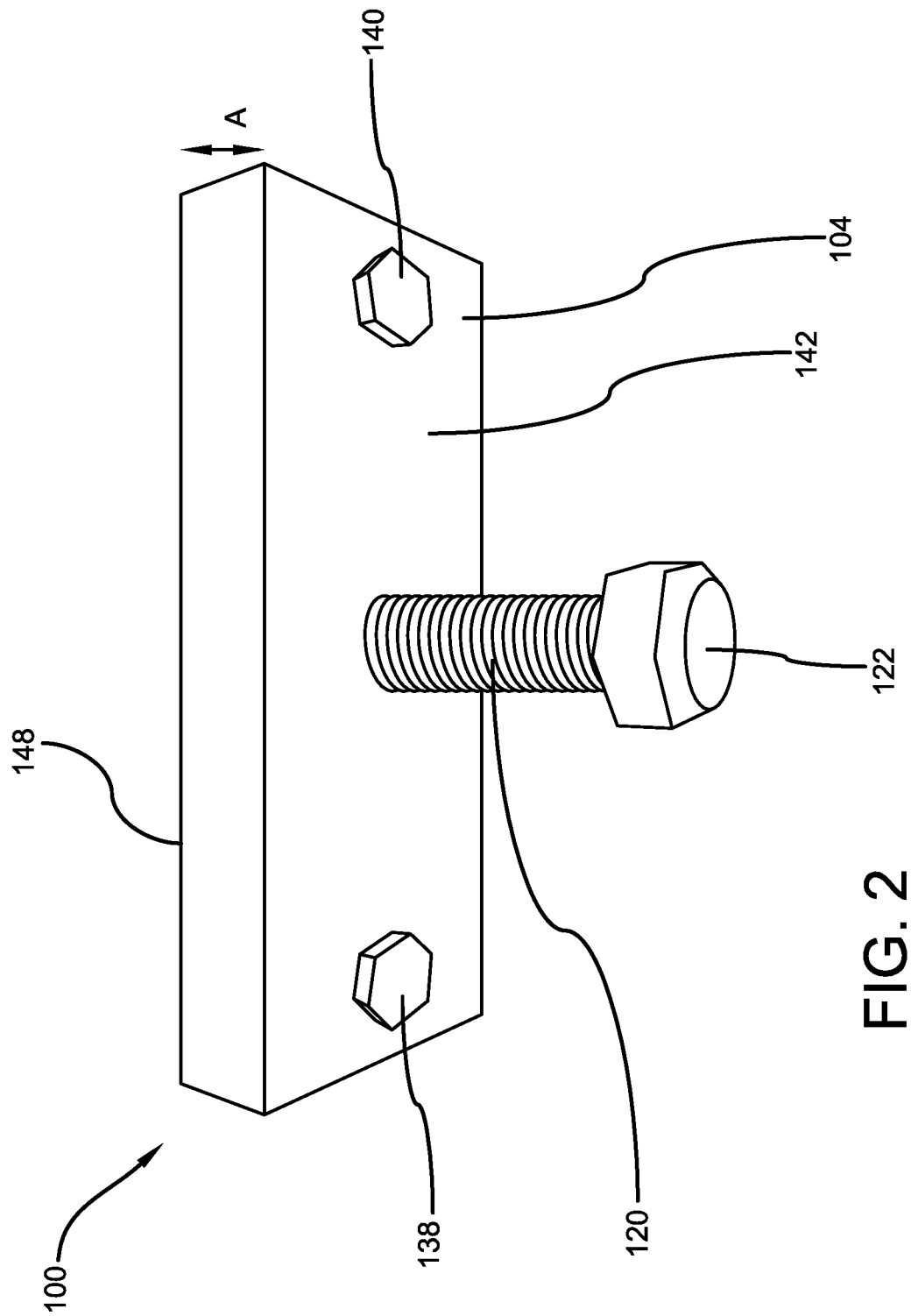
FIG. 2 illustrates a front perspective view of the axle hub and rotor assembly removal tool of the present invention in accordance with the disclosed architecture.
Figure 3:
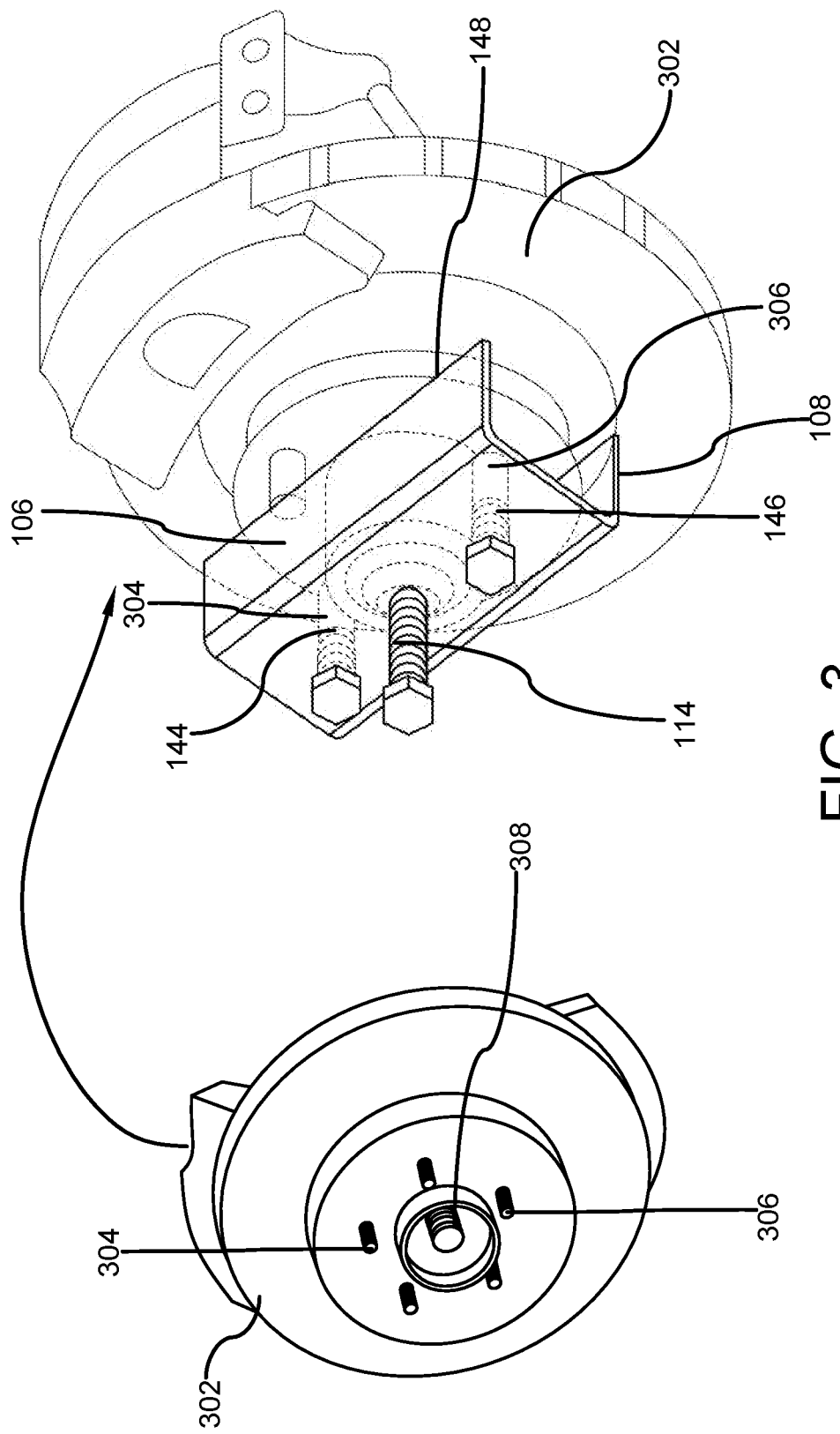
FIG. 3 illustrates a perspective view showing the axle hub and brake rotor assembly removal tool installed for removing the brake rotor in accordance with the disclosed architecture.

As illustrated in FIG. 2, the head 122 of the threaded rod 114 and the heads 138, 140 of the sets 126, 128 respectively abut against the outer surface 142 of the rectangular metal plate 104 upon installation of the tool 100 for removing a brake rotor. The nuts 144, 146 of sets 126, 128 are designed to thread onto the wheel studs of the brake rotor as illustrated in FIG. 3 for enabling a user to loosen the brake rotor.

It will be apparent to a person skilled in the art that the brake rotor removal tool 100 is designed to fit over an axle hub of an axle such that the sets 126, 128 are dimensioned to fit to the wheel studs enabling a user to easily remove the brake rotor. The tool 100 can be made of metal such as iron or an alloy such as steel and further, the rectangular plate 104 can be easily held by a user along the side edges 134, 136 for pulling the brake rotor to detach from the axle hub.

FIG. 2 illustrates a front perspective view of the axle hub and rotor assembly removal tool of the present invention in accordance with the disclosed architecture. The width (shown by arrow A) of the plates 106, 108 is less than (about 90%) the length of the bolts of the sets 126, 128. The heads 122, 138, 140 abut the front surface 142 of the plate 104 when the sets 126, 128 are threaded to the wheel studs of the brake rotor.

The threaded rod 114 and the sets 126, 128 are easily movable through the respective holes for enabling a user to use a drill, an impact wrench, a socket wrench, a screwdriver, or any other manual or automatic tool to install the device 100 to remove the brake rotor. In use, the device 100 is placed on the brake rotor such that the free edges 148 of the plates 106, 108 abut against the brake rotor for providing a stable position used for pulling the brake rotor to detach from the axle hub.

FIG. 3 illustrates a perspective view showing the axle hub and rotor assembly removal tool installed for removing brake rotor in accordance with the disclosed architecture. The tool 100 is placed on the axle hub after removing a tire to access the brake rotor 302. The nuts 144, 146 are threaded onto the wheel studs 304, 306 of the brake rotor 302 to fix the tool 100 and fasten to the brake rotor 302. When the nuts 144, 146 are fastened to the studs 304, 306, the free edge 148 adheres to the brake rotor 302. The nuts 144, 146 are turned clockwise either by using a tool on the heads 138, 140 of the sets 126, 128 or manually by rotating the main body 102. The nuts 144, 146 are preferably ½"-13 nuts and are turned until the nuts 144, 146 bottom out against the brake rotor's wheel studs 304, 306. This creates a space between the brake rotor 302 and the axle hub as illustrated in FIG. 4.

The threaded rod 114 is inserted into the central opening 308 and is then turned clockwise until the bottom end 124 of the threaded rod 114 contacts the axle shaft, thereby providing a point of leverage for separating the brake rotor 302 from the axle shaft.

Figure 4:
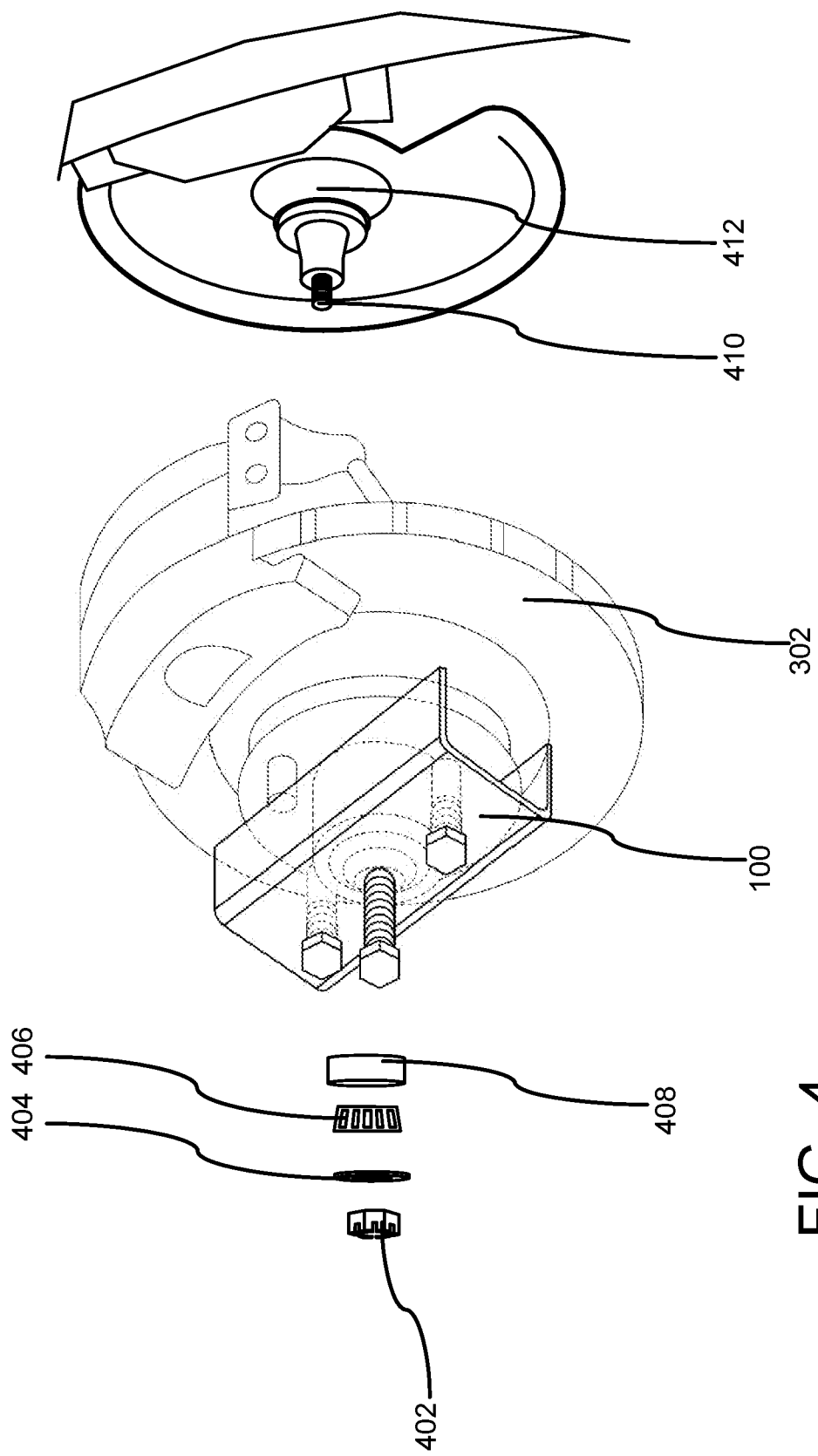
FIG. 4 illustrates an exploded view showing removal of the brake rotor from the axle using the tool of FIG. 1 in accordance with the disclosed architecture.

FIG. 4 illustrates an exploded view showing removal of the brake rotor from the axle using the tool of FIG. 1 in accordance with the disclosed architecture. For attaching the tool 100 and removing the brake rotor 302, the castle nut 402 is removed and then washer 404, outer bearing 406, and outer race 408 are removed. Thereafter, the device 100 is installed as described in FIG. 3 to create a gap between the brake rotor 302 and the axle shaft 410. The threaded rod 114 when turned clockwise increases the distance between the brake rotor 302 and the axle shaft 410. The force gradually separates the brake rotor 302 from the axle hub 412. The device 100 applies even force distribution and helps ensure that the brake rotor comes off evenly, minimizing the risk of damage.

The axle brake rotor puller device 100 provides an innovative device designed to simplify the challenging task of removing brake rotors from a Rockwell drive axle. The threaded rod and nut assembly enable controlled and even force application, making the brake rotor removal process safer and more efficient.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "axle hub and rotor assembly removal tool", "axle brake rotor puller device", "brake rotor removal tool", "device", and "tool" are interchangeable and refer to the axle hub and rotor assembly removal tool 100 of the present invention.

Notwithstanding the forgoing, the axle hub and rotor assembly removal tool 100 of the present invention can be of any suitable size and configuration as is known in the art without affecting the overall concept of the invention, provided that it accomplishes the above stated objectives. One of ordinary skill in the art will appreciate that the axle hub and rotor assembly removal tool 100 as shown in the FIGS. 1-4 are for illustrative purposes only, and that many other sizes and shapes of the axle hub and rotor assembly removal tool 100 are well within the scope of the present disclosure. Although the dimensions of the axle hub and rotor assembly removal tool 100 are important design parameters for user convenience, the axle hub and rotor assembly removal tool 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An axle hub and rotor assembly removal and transporting tool comprising:
   a brake rotor removal and transporting device having a main body including a main metal plate and a pair of transverse plates;
   wherein said pair of transverse plates having a top transverse plate extending transversely from a top lateral edge of said main metal plate and a bottom transverse plate extending transversely from a bottom lateral edge of said main metal plate;
   wherein said main body forming a channel for installation of said brake rotor removal device over an axle hub and rotor assembly;
   wherein said main metal plate having a threaded rod passing through a central hole disposed on said main metal plate including a hex nut coupled with said threaded rod for guiding said threaded rod;
   wherein said threaded rod having continuous threads from a head to a bottom end of said threaded rod;
   wherein said main metal plate having a first assembly comprising a first nut and a first bolt passing through a first off-centered hole disposed on said main metal plate, and a second assembly comprising a second nut and a second bolt passing through a second off-centered hole disposed on said main metal plate;
   wherein said first nut threadable onto a first wheel stud and said second nut threadable onto a second wheel stud of a brake rotor for enabling a user to loosen the brake rotor;
   wherein the main metal plate is a rectangular top plate;
   wherein the top transverse plate extends along an entire length of the top lateral edge of said main metal plate, and the bottom transverse plate extends along an entire length of the bottom lateral edge of said main metal plate parallel to the top transverse plate; and
   wherein a width of the top transverse plate is less than a length of the first bolt.

2. The axle hub and rotor assembly removal and transporting tool of claim 1, wherein said first off-centered hole and said second off-centered hole are equidistant from opposing edges of said main metal plate.

3. The axle hub and rotor assembly removal and transporting tool of claim 2, wherein said first off-centered hole and said second off-centered hole are equidistant from said central hole.

4. The axle hub and rotor assembly removal and transporting tool of claim 1, wherein said main body is a one-piece structure.

* * * * *